Figure 1:
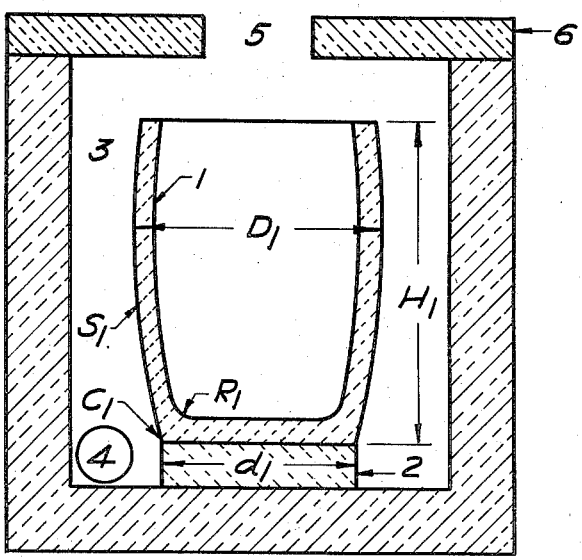

Feb. 27, 1951

C. F. LEITTEN ET AL 2,543,700

CRUCIBLE FOR METAL MELTING

Filed Jan. 31, 1948

INVENTORS:
CARL F. LEITTEN
TOM W. CAMPBELL
PER Parker, Prochnor Harmel
ATTORNEYS Patented Feb. 27, 1951

2,543,700

UNITED STATES PATENT OFFICE 2,543,700

CRUCIBLE FOR METAL MELTING

Carl F. Leitten, Hamburg, N. Y., and Tom W. Campbell, Poland, Ohio, assignors to Electro Refractories & Alloys Corporation, Buffalo, N. Y.

Application January 31, 1948, Serial No. 5,638

7 Claims. (Cl. 263—48)

This invention relates to crucibles for melting and containing molten metals and particularly to the inter-relation of dimensions of the parts thereof in such a manner as to increase their efficiency in use and prolong their life.

Crucibles for this purpose have been manufactured for many years, usually in the shape of open topped barrels with a central bilge larger than the top in order to facilitate handling them with tongs to place them in a furnace or pour out their contents. The dimensions of the various parts have in general been kept inter-related by crucible manufacturers in such a manner that when the outside height of the pot is represented by H, the Bottom diameter of pot is 59.3% of H
Top diameter of pot is 74.8% of H
Bilge diameter of pot is 81.0% of H
Height of bilge above base is 65% of H
Radius of curvature of outside wall of pot in a vertical plane passing through the axis is 2H.

In certain special pots the top diameter and the bilge diameter have been approximately equal and in a few instances the bottom diameter has been equal to the diameter further up but more commonly the side wall of the pot curves in downwardly as described above and intersects the base at such a position as to make the cross sectional area of the pot at its bilge from 1¾ to 2¼ times the area of the base of the pot, the ratio for a standard pot as specified above being 1.87.

The configuration has moreover been such that when a section is cut in a plane passing through the axis of the crucible, the side as it meets the bottom is seen to be convex outwardly and the inside meets the bottom either at a sharp angle or in a relatively sharply curved fillet. In this way, the downward weight of the metal has been supported directly by the interior bottom of the pot over an area almost equal to the outside base of the pot. This base in turn has been supported on a pedestal roughly the same size as itself, around which pedestal flame for heating the pot enters the combustion chamber in which both the pot and the pedestal stand. The combustion gases then swirl round and round the pot and emerge through a flue or other hole in the upper part of the furnace.

We have discovered that not only is it not necessary to support the pot on such a broad base but that both the life of the crucible and the efficiency of the melting operation are materially improved by redesigning the crucible in a manner whereby the outside surface of the wall below the bilge is curved more sharply inward so that a vertical section thereof approximates a portion of an ellipse having a ratio of major axis to minor axis between 3:1 and 4:3, and so that the pot rests on a far smaller base having an area from about ⅕ to about ⅓ the area of cross section of the pot at its largest diameter. In crucibles made in accordance with a preferred embodiment of our invention the opposite sides of the lower portion of the pot constitute parts of the same ellipse although we limit our invention only within the scope of the appended claims. We find it also desirable that the interior wall of the pot merge with the base in a smooth curve having a minimum radius at least half as great as the radius of the pot base. We moreover frequently provide the outside base of the pot with a downwardly extending foot to increase the area exposed to the heating gases.

The exact nature of our invention will be apparent from consideration of the attached drawings in which Fig. 1 shows a schematic axial cross section of the conventional type crucible set on a pedestal in a furnace.

Figure 2:
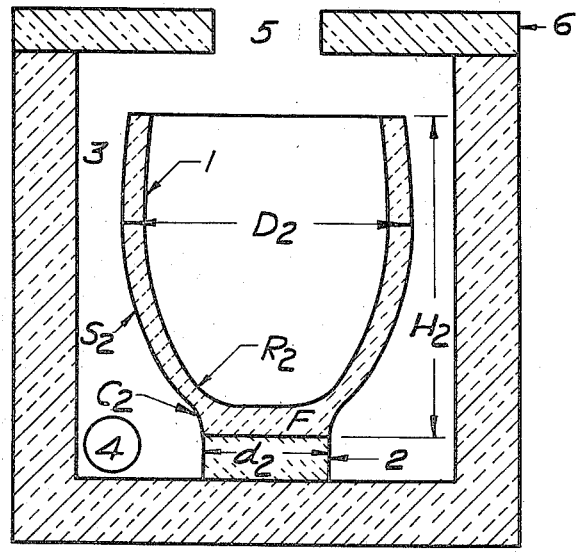

Fig. 2 shows a cross section of one embodiment of our improved type crucible, in a plane passing through the axis thereof, the crucible being set on a pedestal in a furnace.

As shown in the drawings, crucible 1 rests on pedestal block 2 of suitable refractory material on the bottom of a combustion chamber 3 having a cover 6. Combustion gases for heating the crucible and melting its contents are introduced through burner port 4 at the level of the pedestal and swirl round and round the pot until they finally escape through vent 5 in the furnace cover. The upper portion of both the conventional and our new type crucibles is frequently shaped to form a pouring lip or spout but this is not shown here as it is not a part of the present invention.

Both the crucible illustrated in Fig. 1 as of the old conventional type and our new type shown in Fig. 2 are similarly placed in the furnace although due to its smaller base our new type is supported on a smaller diameter pedestal block of the same diameter as the base of the pot. This leaves more combustion space beside the pedestal and the broadening pot thereabove keeps the flame down in this enlarged space thus causing more complete combustion to occur in that portion of the furnace. This promotes faster melting and lessens the tendency to coke formation. It also reduces flame velocity and lessens wear on the pot, pedestal and furnace particularly at spots where localized flame impingement is otherwise very destructive. The cost of the smaller pedestal block is also less, thus adding to the saving made possible through operating economy.

Moreover the large distance across the bottom of the pot of Fig. 1 where $d_1$ represents the diameter of the base causes far greater temperature differentials to be set up within the base of the pot than are found with our improved smaller base pot. This causes more severe strains and earlier breakage in the old type than with our pot. The relatively greater proportion of the surface of our pot which is exposed to contact with the combustion gases facilitates heat transfer to the metal within the pot and speeds melting. Heat is moreover carried in through the highly conducting refractory foot F of our pot to the metal on the pot bottom so that even at the center of the bottom melting is rapid.

In both Figures 1 and 2, where suitable subscripts are used to differentiate them, H represents the outside height of the pot, D its greatest ouside diameter, $d$ the diameter of the base on which it rests and R the radius of the curve in which the inside bottom and the side wall of the pot are joined.

We have made a study of the desirable interrelation of these various dimensions and quote below certain values of the dimensions and their ratios in both styles of pots. Table 1 shows the values for old conventional style pots as made by one leading producer and Table 2 for our improved design. The size numbers in each case designate certain metal capacity as recognized in the trade.

Table 1

| Size Pot | H | D | d | R | H/d | Ratios | |
|---|---|---|---|---|---|---|---|
| | | | | | | Max. Section / Base | R÷½ d |
| | Inches | Inches | Inches | Inches | | | |
| 150 | 19¼ | 15⅛ | 10¼ | 2 | 1.88 | 2.16 | .39 |
| 275 | 23⅛ | 17⅞ | 12⅜ | ⅞ | 1.87 | 2.07 | .14 |
| 300 | 23¾ | 18⅜ | 13⅛ | 1½ | 1.80 | 1.96 | .23 |
| 600 | 28 | 23¾ | 14½ | 3 | 1.93 | 2.60 | .41 |
| 1400 | 26 | 20⅜ | 14¾ | 1¾ | 1.76 | 1.90 | .24 |
| 1500 | 28½ | 20⅜ | 14¾ | 1¾ | 1.93 | 1.90 | .24 |
| Average | | | | | 1.86 | 2.10 | .275 |

Table 2

| Size Pot | H | D | d | R | H/d | Ratios | |
|---|---|---|---|---|---|---|---|
| | | | | | | Max. Section / Base | R÷½ d |
| | Inches | Inches | Inches | Inches | | | |
| 150 | 19¼ | 15⅜ | 8 | 2½ | 2.41 | 3.69 | .62 |
| 275 | 22⁹⁄₁₆ | 17¹⁵⁄₁₆ | 9 | 3¼ | 2.50 | 3.96 | .72 |
| 300 | 24 | 18¼ | 9 | 3¼ | 2.66 | 4.13 | .72 |
| 600 | 27¼ | 23⅝ | 12 | 5 | 2.27 | 3.88 | .83 |
| 1400 | 26 | 20⁹⁄₁₆ | 10 | 4¹⁵⁄₁₆ | 2.60 | 4.22 | .99 |
| 1500 | 28½ | 20⁹⁄₁₆ | 10 | 4¹⁵⁄₁₆ | 2.85 | 4.22 | .99 |
| Average | | | | | 2.55 | 4.02 | .81 |

It will be observed that both the ratio of height to base diameter and the ratio of maximum sectional area to base area are substantially greater in the case of our improved pots than for the older type and also that in our case, the radius R is well over half the radius of the base rather than slightly over one quarter as in the old conventional types.

Attention is also called to the concave-outward curve $C_2$ immediately above the base in our pot as compared with the sharp convex curve $C_1$ in the conventional pot and also to the approximately elliptical form of section $S_2$ below the bilge of our pot as distinguished from the long radius circular section $S_1$ of conventional pots.

Our new type pots may be made in the usual manner familiar to those skilled in the art from any of the usual materials used to form crucibles but are particularly successful when made with carbon bonded mixtures of graphite and silicon carbide such as described in U. S. Patents No. 1,458,913 and No. 1,658,406.

While it might appear that the modification of shape and size of our improved crucibles is a minor variation, our tests in commercial foundry operation have shown the results to be of marked benefit as indicated by the following representative results:

| Material Melted | Life of Pot of Same Size and Composition | |
|---|---|---|
| | Old Type | New Type |
| Aluminum | 50 heats | 150 heats. |
| Brass | 2 to 50 heats | Over 100 heats. |
| Titanium Alloy | 20 to 30 heats | 80 heats. |

There have been other instances where desired furnace operations have been commercially feasible with our improved pots although simply not practical with the older type.

Having thus described our invention and its method of application, what we claim is:

1. A crucible having a base smaller in area than one third the area of cross section of the exterior of the crucible at the mid-section of its height, the diameter of said base being not greater than the vertical distance from the base to the said mid-section of the crucible and the top of the crucible being of less diameter than the bilge thereof, the contour of the lower portion of the exterior of the crucible being such that a plane passing through the vertical axis of the crucible forms a concave line where it intersects the side wall of the crucible adjacent to the base.

2. A crucible whose lower half consists of a solid of revolution about a vertical axis, the outer portion thereof comprising a flat base having a diameter from one third to one half the height of the crucible and not greater than one half the maximum diameter of the crucible, the inner surface of the crucible comprising a bottom merging continuously into the side wall of the crucible in such manner that the intersection with said surface of a plane passing through the axis of the crucible will be a line having a minimum radius of curvature at least half as great as the radius of the base of the crucible.

3. A crucible whose outer side surface below the bilge thereof intersects any plane passing through the axis of the crucible in a curve approximately a portion of an ellipse whose major axis is from 1.3 to 3 times the minor axis of the ellipse, said crucible having a flat base with an area from ⅓ to ⅕ the cross sectional area of the bilge of the crucible, the open top of the crucible being of less diameter than the bilge thereof and the contour of the lower portion of the exterior of the crucible being such that a plane passing through the vertical axis of the crucible forms a concave line where it intersects the side wall of the crucible adjacent to the base.

4. A crucible for melting metals, said crucible being of substantially circular horizontal section and elliptical vertical section, the opposite sides of the bottom half of the wall of the crucible constituting part of an ellipsoid of such form that the length of the vertical axis of the ellipsoid bears a ratio to the length of its horizontal axis of at least 4:3, said crucible having a flat foot portion on which the same may rest, and which is of circular horizontal cross section, the bottom of the inner surface of the crucible being joined to said ellipsoidal side by a curved surface, the radius of which in a vertical plane is at least equal to one-half the radius of said flat foot portion, the open top of the crucible being of less diameter than the bilge thereof and the contour of the lower portion of the exterior of the crucible being such that a plane passing through the vertical axis of the crucible forms a concave line where it intersects the side wall of the crucible adjacent to the base.

5. A crucible for molten metal consisting generally of a hollow solid revolution about a vertical axis and flaring outwardly above its base, the outside height of the crucible being greater than its maximum outside diameter and at least 2.25 times the diameter of its base, in which the interior surface of the wall of the crucible merges with the interior surface of the bottom thereof in a curve having a minimum radius measured in a plane passing through the axis of the crucible at least half as great as the radius of the base of the crucible, the contour of the lower portion of the exterior of the crucible being such that a plane passing through the vertical axis of the crucible forms a concave line where it intersects the side wall of the crucible adjacent to the base.

6. A crucible for molten metal consisting generally of a hollow solid revolution about a vertical axis and flaring outwardly above its base, the outside height of the crucible being greater than its maximum outside diameter and at least 2.25 times the diameter of its base, in which the intersection of the side wall of the crucible below the bilge thereof with a plane passing through the axis of the crucible approximates a portion of an ellipse in which the ratio of the major axis of the ellipse to the minor axis thereof lies between 4:3 and 3:1, the contour of the lower portion of the exterior of the crucible being such that a plane passing through the vertical axis of the crucible forms a concave line where it intersects the side wall of the crucible adjacent to the base.

7. A crucible for molten metal consisting generally of a hollow solid revolution about a vertical axis and flaring outwardly above its base, the outside height of the crucible being greater than its maximum outside diameter and at least 2.25 times the diameter of its base, in which the intersection of the side wall of the crucible below the bilge thereof with a plane passing through the axis of the crucible approximates a portion of an ellipse in which the ratio of the major axis of the ellipse to the minor axis thereof lies between 4:3 and 3:1, and in which crucible the cross sectional area of the bilge of the crucible is from 3 to 5 times the area of the base of the crucible, the contour of the lower portion of the exterior of the crucible being such that a plane passing through the vertical axis of the crucible forms a concave line where it intersects the side wall of the crucible adjacent to the base.

CARL F. LEITTEN.
TOM W. CAMPBELL.

REFERENCES CITED

The following references are of record in the file of this patent:

UNITED STATES PATENTS

| Number | Name | Date |
|---|---|---|
| 108,084 | Atwood | Oct. 11, 1870 |
| 799,744 | Mackay | Sept. 19, 1905 |
| 854,551 | Allen | May 21, 1907 |
| 1,358,816 | Bellis | Nov. 16, 1920 |
| 1,481,228 | Rondelli | Jan. 15, 1924 |
| 2,269,176 | Booth et al. | Jan. 6, 1942 |